June 11, 1935.  D. M. BLACKBURN  2,004,562
ADJUSTABLE SHAFT MOUNTING
Filed Feb. 3, 1934  2 Sheets-Sheet 2
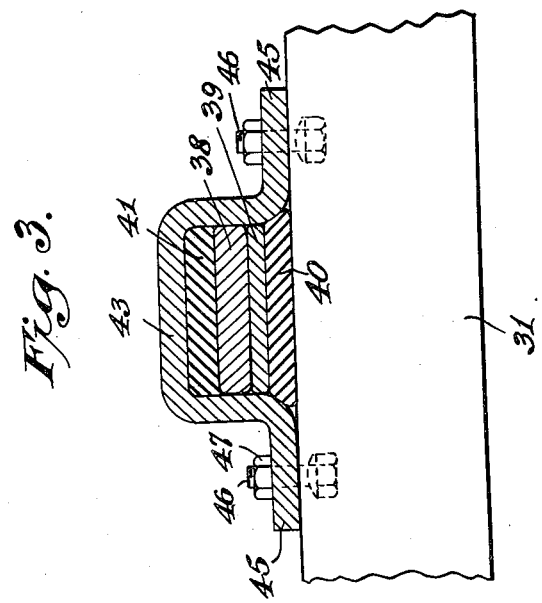
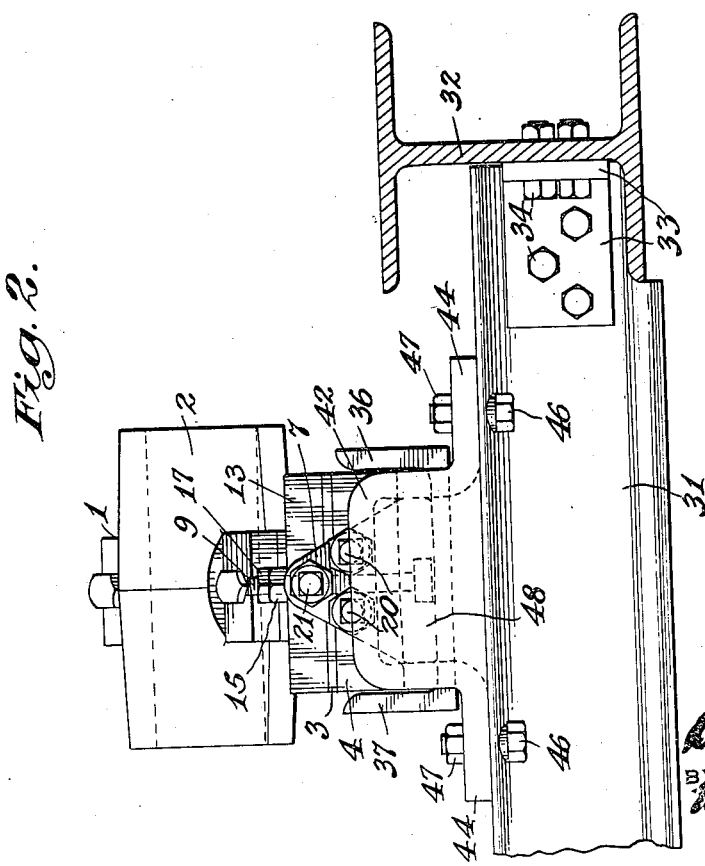

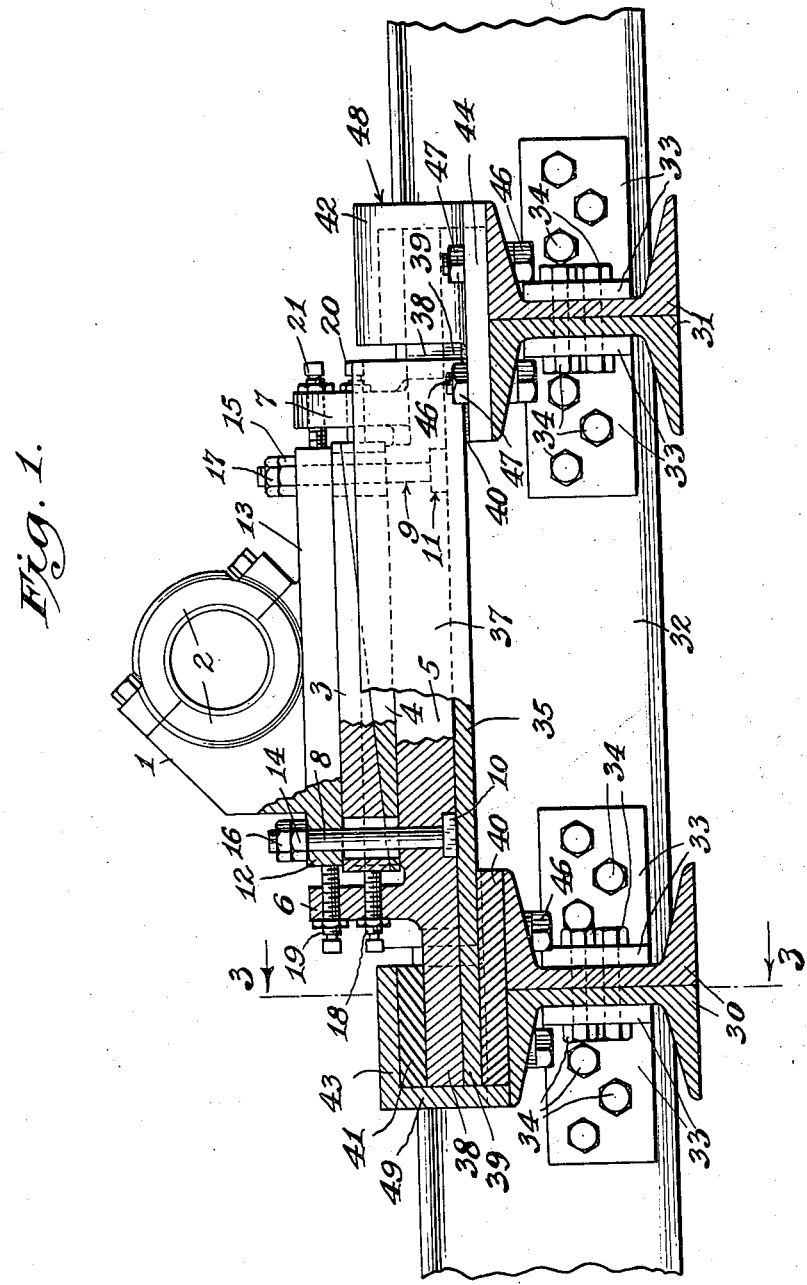

Patented June 11, 1935

2,004,562

UNITED STATES PATENT OFFICE 2,004,562

ADJUSTABLE SHAFT MOUNTING

Daniel M. Blackburn, Carbondale, Pa., assignor to Hendrick Manufacturing Company, Carbondale, Pa., a corporation of Pennsylvania Application February 3, 1934, Serial No. 709,568

6 Claims. (Cl. 308—59)

This invention relates to an adjustable shaft mounting, and is a continuation in part of my application filed May 16, 1933, Serial No. 671,313, for Shaking screen.

One of the objects of this invention is to provide a shaft mounting which is adjustable to change the relative elevation of the shaft bearing, so as to vary the location of a shaft carried in said bearing, or to compensate for wearing of the bearing, or for other purposes.

Another object of this invention is to provide a shaft mounting which supports the shaft bearing in a floating manner.

A further object of this invention is to provide a shaft mounting of extremely sturdy and durable construction, and so constructed as to cushion the pillow block and a drive shaft supported thereby, so that the pillow block and shaft stand up and serve better under heavy loads and heavy jars and shocks.

Another object of this invention is to provide an improved shaft mounting well suited for the drive of shaking screens for grading and sifting of coal, stone and other heavy material, and to provide a shaft mounting whereby the location of the shaft bearing thereof, and the drive shaft therein, may be adjusted toward and away from the rocking axis of the screen hanger to vary the rocking pitch of the hanger and to vary the swing of the screen accordingly, as disclosed in my said prior application.

Other objects of this invention will be in part obvious and in part pointed out hereinafter.

In accordance with this invention means are provided whereby the pillow block may be raised and lowered relatively to a supporting base block or plate to shift the location of the shaft bearing and a shaft therein accordingly, and the base block or plate is supported between upper and lower shock absorbing members, which may be rubber cushions under compression, whereby the entire drive is supported in a floating manner. Other features will be set forth, or will be obvious, from the detailed description which follows, and from the accompanying drawings, which form a part of this application and illustrate certain possible embodiments of this invention, and to which reference is now made, and in which:

Fig. 1 is a side view, partly in section, of a drive mounting embodying this invention;

Fig. 2 is an end view thereof as viewed from the right of Fig. 1, and

Fig. 3 is a sectional view of a detail thereof, and is taken on the line 3—3 of Fig. 1.

Similar reference characters refer to similar parts throughout the several views of the drawings.

As shown in the drawings, the pillow block 1 carries a shaft bearing 2. The bottom of the pillow block rests on the upper face of the upper of two co-acting, oppositely directed wedge members or plates, 3 and 4, which have their meeting faces inclined at complementary angles. The under surface of the lower wedge 4 rests on a base block or plate 5 which has upright portions or bosses, 6 and 7, one at each end of the wedges 3, 4, and spaced therefrom. The pillow block 1, wedges 3, 4, and base block 5, are tightly clamped together by two bolts, 8 and 9, one at each end of the pillow block, and each having a head 10, 11, counter-sunk in a recess therefor in the bottom surface of the block 5, and extending upwardly through a bolt hole in the base block, extra wide aligning holes in the wedges 3 and 4, permitting the wedges to be moved endwise relatively to the bolts, base block and pillow block, when the bolts are sufficiently loose, and through bolt holes in extending portions 12 and 13 of the pillow block, and carrying nuts 14 and 15 which bind against the pillow block portions 12 and 13, and are provided with lock nuts 16 and 17.

Boss 6 of base block 5 has a pair of threaded perforations housing set screws 18 which abut wedge 3 endwise, and has another threaded perforation housing another set screw 19 which abuts the pillow block 1. Similarly, boss 7 of base block 5 has a pair of threaded perforations housing set screws 20 bearing against wedge 4 and a third threaded perforation housing a third set screw 21 bearing against the pillow block.

It will be apparent that with nuts 14 and 15 loosened, by screwing up the adjusting screws 18 and 20 the wedges 3 and 4 are moved inwardly of each other, thus raising the pillow block 1 and its bearing 2, (and consequently a shaft in said bearing) upwardly off the base block 5. Conversely, if the adjusting screws 18 and 20 are withdrawn from the positions shown in Fig. 1 and the wedge blocks 3 and 4 separated accordingly, the pillow block and its bearing and a shaft therein will be lowered toward the base block 5. When adjusted, the parts may be clamped together tightly by tightening nuts 14 and 15, and endwise movement of the pillow block is further prevented by the abutting set screws 19 and 21, which also serve to lessen transverse strains on the bolts 8 and 9.

In the drawings the assembly referred to is shown as being mounted on a support comprising a pair of H beams 30 and 31, which may extend between other beams, for instance, I beams such as 32, and may be secured thereto by suitable angle irons 33 and rivets or bolts 34. Each of the H beams, as shown, may be made of two channel irons placed back-to-back and secured together by the angle irons 33 and bolts 34.

Base block 5 rests on the bottom wall 35 of a channel iron which has side walls 36 and 37 extending upwardly along each side of block 5. Block 5 and the channel iron have similar extensions 38 and 39 at both ends. Between each channel iron extension 38, 39, and the H beams is a rubber pad or cushion 40, and on each block extension 38 is a rubber pad or cushion 41. The assembly is clamped securely to the H beams 30, 31 by a pair of straps 42 and 43, one at each end, each strap extending over one of the rubber blocks 40 and having a foot or base portion 44, 45, bolted down on the top of the H beam, as by bolts 46 and their nuts 47. If desired each strap may also have a side wall 48, 49 abutting an end of the base block and channel iron extensions to further secure the assembly against any end play relative to the H beams.

Preferably the height of the straps and the thicknesses of the rubber cushions are such that when the straps are drawn down by tightening the nuts 47, the rubber cushions are placed under compression. In any event, the drive is mounted in a floating manner and gives very satisfactory operation with greater durability and increased ability to satisfactorily withstand heavy duty and the attendant jars, shocks and strains, and for a longer time.

Obviously instead of the specific support structure shown, the assembly may be supported on and secured to any suitable floor, or other suitable foundation or supporting structure.

As many changes could be made in the above construction, and as many apparently widely different embodiments of this invention could be made without departing from the scope thereof, it is understood that all matter contained in the above description or shown in the accompanying drawings be interpreted as illustrative and not in a limiting sense.

What I claim is:—

1. In a shaft mounting of the character described, in combination, a base block, a channel iron embracing the base block from below and having a side wall at each side of the base block, the base block and channel iron having aligning extending portions at both ends, a support, resilient members between the channel iron extensions and the support, a strap extending over each base block extension, resilient members intermediate the block extensions and straps, and means tightly clamping said straps to the support and placing and maintaining the resilient members under compression.

2. In a shaft mounting of the character described, in combination, a base block, a channel iron embracing the base block from below and having a side wall at each side of the base block, the base block and channel iron having aligning extending portions at both ends, a support, resilient members between the channel iron extensions and the support, a strap extending over each base block extension, resilient members intermediate the block extensions and straps, and means tightly clamping said straps to the support and placing and maintaining the resilient members under compression, each strap having a side wall abutting the adjacent ends of the extensions of the base block and channel irons.

3. In a shaft mounting of the character described, in combination, a pillow block, a base block, a pair of superimposed wedge members intermediate the pillow block and base block and having meeting faces of complementary, opposed inclination, means engaging said wedge members for moving said wedge members relatively to each other to vary the elevation of the pillow block relative to the base block, releasable means for clamping the pillow block, wedge members and base block tightly together, a channel iron embracing the base block from below and having a side wall at each side of the base block, the base block and channel iron having aligning extending portions at both ends, a support, resilient members between the channel iron extensions and the support, a strap extending over each base block extension, resilient members intermediate the block extensions and straps, and means tightly clamping said straps to the support and placing and maintaining the resilient members under compression.

4. In a shaft mounting of the character described, in combination, a pillow block, a base block, a pair of superimposed wedge members intermediate the pillow block and base block and having meeting faces of complementary, opposed inclination, means engaging said wedge members for moving said wedge members relatively to each other to vary the elevation of the pillow block relative to the base block, and means, including bolts extending through aligning bolt holes in the base block, wedge members and pillow block for clamping said base block, wedge members and pillow block tightly together, said bolt holes in the wedge members being enlarged, said wedge members being longitudinally movable relative to said bolts, a channel iron embracing the base block from below and having a side wall at each side of the base block, the base block and channel iron having aligning extending portions at both ends, a support, resilient members between the channel iron extensions and the support, a strap extending over each base block extension, resilient members intermediate the block extensions and straps, and means tightly clamping said straps to the support and placing and maintaining the resilient members under compression.

5. In a shaft mounting of the character described, in combination, a pillow block, a base block having an upwardly extending portion at each end of the pillow block, a pair of superimposed wedge members intermediate the pillow block and base block and having meeting faces of complementary, opposed inclination, means, including set screws threaded in said upwardly extending base block portions and abutting said wedge members, whereby said wedge members may be adjusted longitudinally of each other to vary the elevation of the pillow block relative to the base block, releasable means for clamping the pillow block, wedge members and base block tightly together, a channel iron embracing the base block from below and having a side wall at each side of the base block, the base block and channel iron having aligning extending portions at both ends, a support, resilient members between the channel iron extensions and the support, a strap extending over each base block extension, resilient members intermediate the block extensions and straps, and means tightly clamping said straps to the support and placing and maintaining the resilient members under compression.

6. In a shaft mounting of the character described, in combination, a pillow block, a base block having an upwardly extending portion at each end of the pillow block, a pair of superimposed wedge members intermediate the pillow block and base block and having meeting faces of complementary, opposed inclination, means, including set screws threaded in said upwardly extending base block portions and abutting said wedge members, whereby said wedge members may be adjusted longitudinally of each other to vary the elevation of the pillow block, relative to the base block, releasable means for clamping the pillow block, wedge members and base block tightly together, other set screws threaded in said upwardly extending base block portions and abutting opposite ends of the pillow block, a channel iron embracing the base block from below and having a side wall at each side of the base block, the base block and channel iron having aligning extending portions at both ends, a support, resilient members between the channel iron extensions and the support, a strap extending over each base block extension, resilient members intermediate the block extensions and straps, and means tightly clamping said straps to the support and placing and maintaining the resilient members under compression, each strap having a side wall abutting the adjacent ends of the extensions of the base block and channel iron.

DANIEL M. BLACKBURN.